Aug. 4, 1959  D. WINFIELD ET AL  2,897,664
STRAIGHT BAR KNITTING MACHINE
Filed Feb. 15, 1954  9 Sheets-Sheet 1

Inventors:
DENIS WINFIELD AND
ERNEST START
By

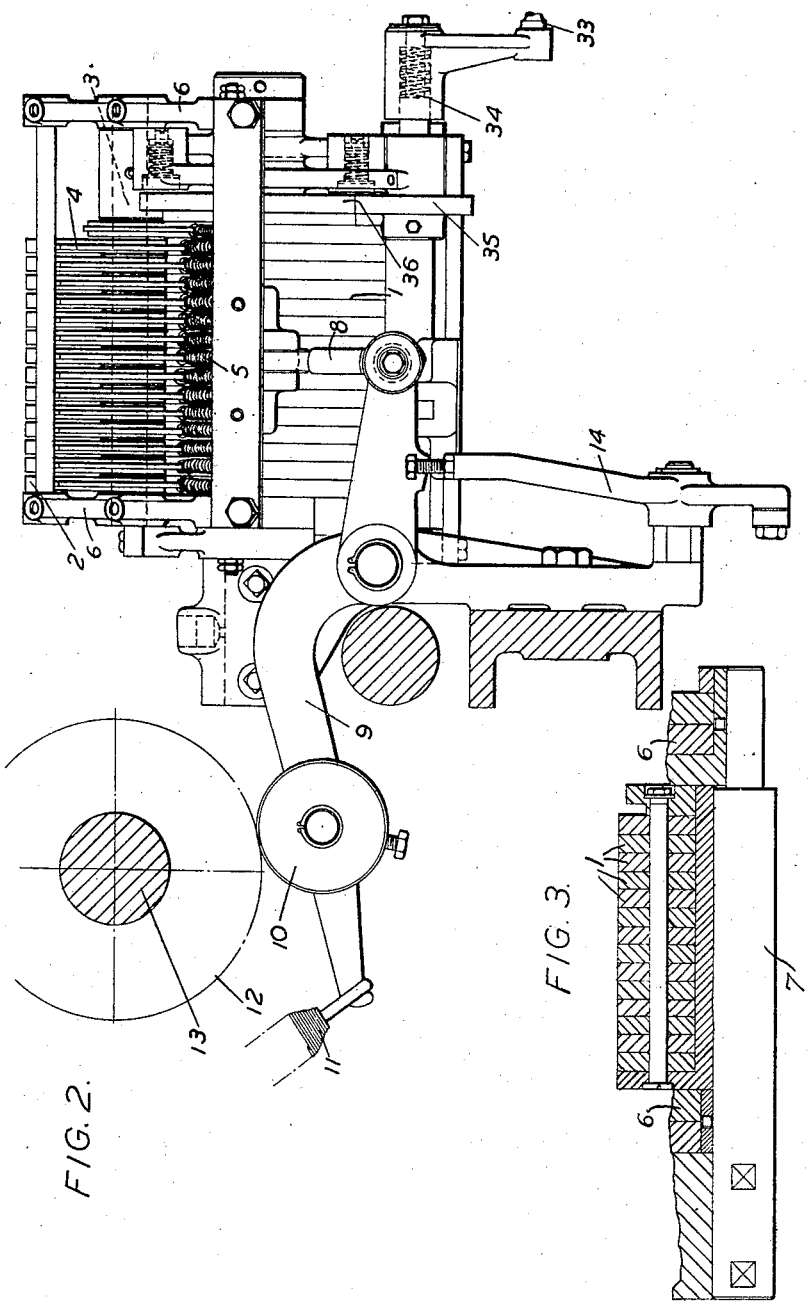

Inventors:
DENIS WINFIELD AND
ERNEST START

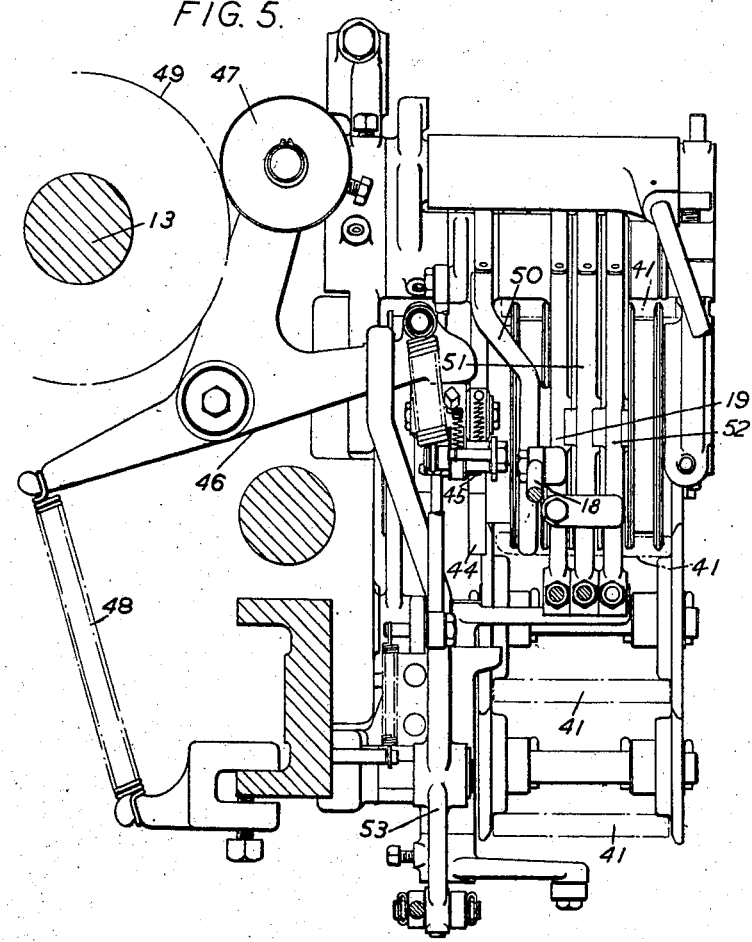
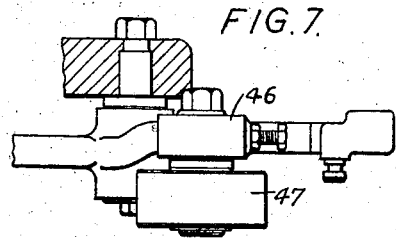

Aug. 4, 1959　　　D. WINFIELD ET AL　　　2,897,664
STRAIGHT BAR KNITTING MACHINE
Filed Feb. 15, 1954　　　　　　　　　　9 Sheets-Sheet 6

Inventors:
DENIS WINFIELD AND
ERNEST START
By

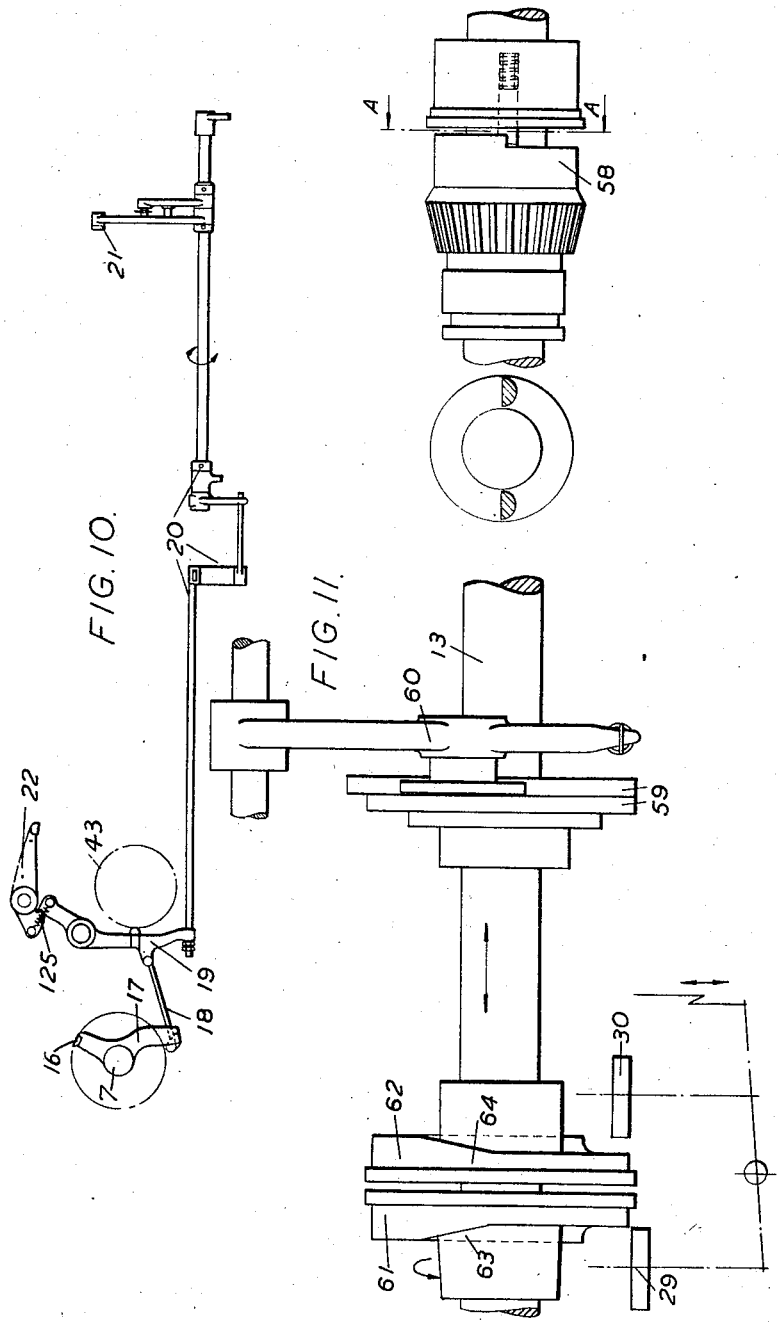

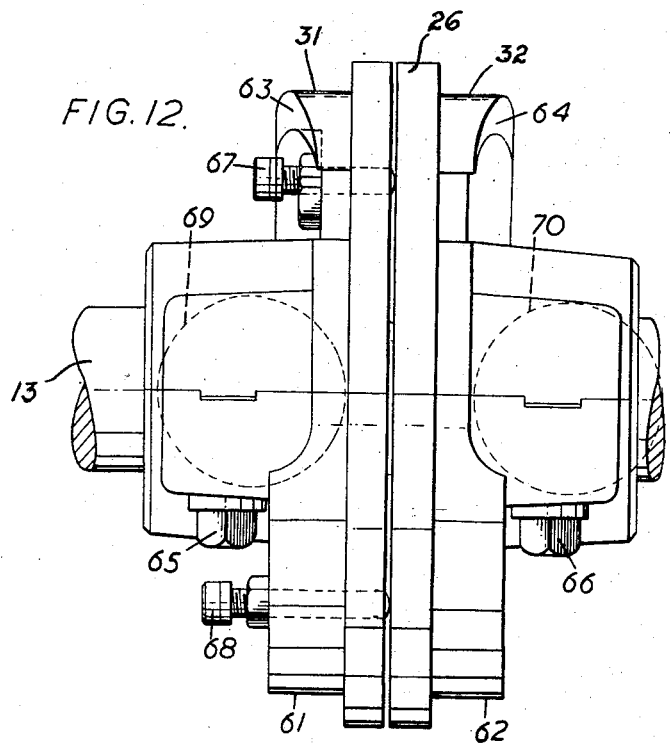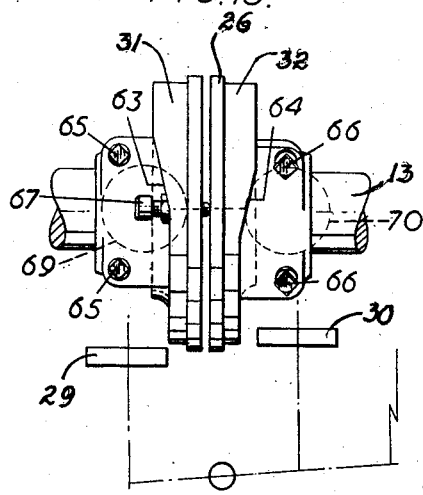

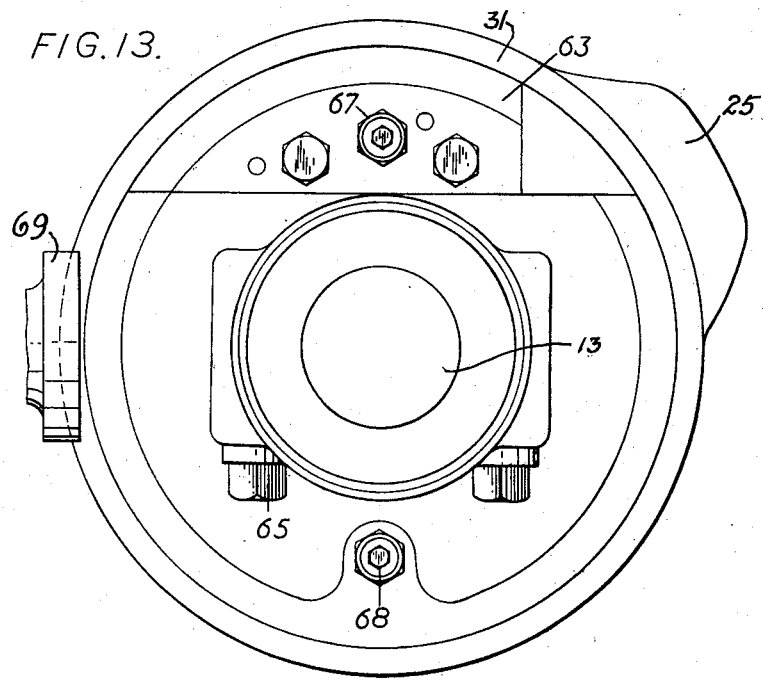
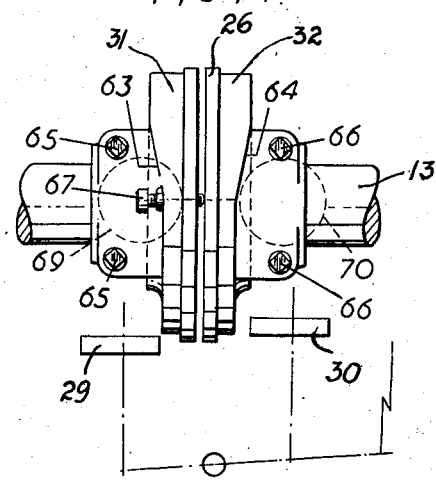

United States Patent Office 2,897,664
Patented Aug. 4, 1959

2,897,664

STRAIGHT BAR KNITTING MACHINE

Denis Winfield, Shepshed, and Ernest Start, Wilford, Nottingham, England, assignors to William Cotton Limited Application February 15, 1954, Serial No. 410,354

Claims priority, application Great Britain December 31, 1953

13 Claims. (Cl. 66—82)

This invention is for improvements in or relating to straight bar knitting machine and is primarily concerned with underwear and outerwear or pant frames. In these latter machines it has been the general practice to have an appreciable number of hand controls for various purposes including hand displaceable pawls in a multi-pawl and ratchet wheel pattern device such as disclosed in British Patent No. 27,144 of 1896 by which the course frequency of fashioning may be changed as desired.

When employing an underwear and outerwear machine or pant frame it may be sometimes desired to produce a considerable number of identically shaped articles in succession and at other times it may be desired to produce a smaller quantity of each of a plurality of differently shaped articles. However the above known arrangement of fashion control mechanism is not particularly satisfactory for this purpose having regard to the hand operations which are always necessary; other disadvantages are the necessity for slowing down of the machine to be made in a course before a fashioning course and the fact that, by virtue of the construction of the device, there is a limit to the maximum number of possible fashion variations.

An object of the invention is to provide pattern control mechanism by the employment of which the production of fashioned articles generally may be improved.

The invention provides, in a straight bar knitting machine, the combination of a pattern device constructed and arranged for a wide range of pattern selections to be made manually e.g. in fashioning of differently shaped articles, a second pattern device constructed and arranged for predetermined pattern selections to be made automatically e.g. for fashioning of identically shaped articles, and control means for rendering each pattern device operative and inoperative independently of the other. As applied for controlling the course frequency of fashioning, the machine is equipped with machine speed control mechanism and cam shaft or truck shogging means, and a mechanism for effecting slowing of the machine speed and operation of said shogging is provided which is common to both of said pattern devices, said control means being adapted to render each of the pattern devices operative and inoperative on said common mechanism independently of the other. The operation of speed control mechanism of the machine through the medium of said common mechanism is effected in the same fashioning courses in which the shogging is effected.

Conveniently one pattern device is adapted for manually obtaining a plurality of alternative pattern selections by having a plurality of selection elements arranged for manual displacement into and out of operative engagement with a pattern drum or the like, and the second pattern device is adapted for automatically obtaining a plurality of pattern selections by having a predetermined series of pattern elements in sequence on a pattern chain or the like.

It will be understood that a machine employing both of the above drum and chain or the like pattern devices is particularly suitable both for the production of comparatively small numbers of a wide variety of differently shaped articles, by the employment of the drum or the like at some times, and for the successive production of an appreciable number of identically shaped articles, by the employment of the chain or the like at other times.

The invention also provides a manually controlled pattern device for obtaining a plurality of alternative pattern selections and suitable for corresponding selective operation to operate a machine speed control and cam or truck shogging mechanism for fashioning at different course intervals according to the different selections, and having manually operable means for ensuring when desired that said mechanism is operated during an early part of each selective operation of the device, thereby to immediately commence the full fashioning sequence.

The manually operable means conveniently consists of means for zeroing the pattern device at required times.

In this pattern drum device, there is preferably only one selection element for each selection and there is no undue limitation in the maximum number of selection elements that may be employed.

The arrangement of the selection means may be such as not only to provide a regular spaced course frequency of fashioning but also to provide other frequencies such for example as to produce curved fashioning lines.

In cam shaft shogging mechanism, the general practice has been to employ a pair of identical shogging cams with cam parts thereof, in circumferential registry, and a dog clutch for disconnecting the drive whilst the cam shaft is shogged to bring different cams (knitting and fashioning) respectively into engagement with trucks of truck levers; in this arrangement there has been the difficulty that a particular circumferential position of engaging the clutch does not always coincide satisfactorily with those circumferential positions of the cams relatively to the trucks where the shogging should be affected.

Another object of the invention is to avoid this difficulty.

The invention further provides, in a straight bar knitting machine, cam shaft or truck shogging mechanism and a spring loaded clutch for disconnecting the drive whilst shogging takes place, and having the shogging mechanism including a pair of shogging cams capable of being located with their corresponding cam faces at different circumferential locations.

This shogging mechanism may be improved by the provision of circumferential adjustment means and also if desired by axial adjustment means, and it may be employed in the same machine as said drum and chain or the like mechanism.

The foregoing and other features of the invention are incorporated in the construction which is hereinafter described, as a specific embodiment, with reference to the accompanying drawings in which:

Figure 2 is a side view of said device.

Figure 3 is a detail part sectional view of part of said device.

Figure 5 is a side view of Figure 4.

Figure 7 is a plan view of part of Figure 5.

Figure 10 is a somewhat diagrammatical view of connections from fashioning control mechanism to machine speed control means.

Figure 11 is a somewhat diagrammatical illustration of modified cam shaft shogging mechanism.

Figures 12 and 13 are detail front and side views respectively of improved shogging cams.

Figures 14 and 15 are diagrammatic plan views of the modified shogging cams.

Figure 8:
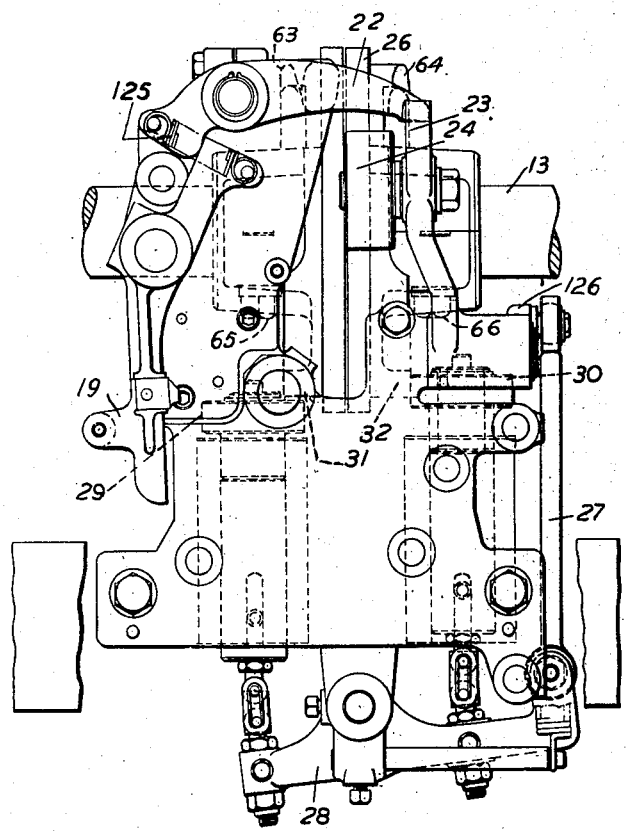
Figure 8 is a front view of cam shaft shogging mechanism.

To enable understanding of the invention, it is explained that an underwear and outerwear machine or pant frame is provided with machine speed control mechanism which may be of conventional character such for example as disclosed in British Patent No. 399,758 to which reference is directed for full details particularly Figure 2, and operable to slow down the speed of the machine for fashioning purposes as disclosed in U.S. Patent No. 2,333,063, and also with cam shaft shogging mechanism for fashioning purposes which may be also of conventional construction such for example as disclosed in U.S. Patent Nos. 658,826 and 703,055 to which reference is directed for full details of the construction particularly Figures 15 and 18 of U.S. Patent No. 658,826 and Figures 20 and 21 of U.S. Patent No. 703,055, and also of the purpose of shogging a cam shaft. The relationship between these arrangements and the mechanism of the present invention is explained hereinafter particularly with reference to Figures 8 and 10 herein.

There is also provided in the machine a multi-pawl-and-ratchet-wheel pattern drum for selective operation of said speed control and shogging mechanism.

Figure 1:
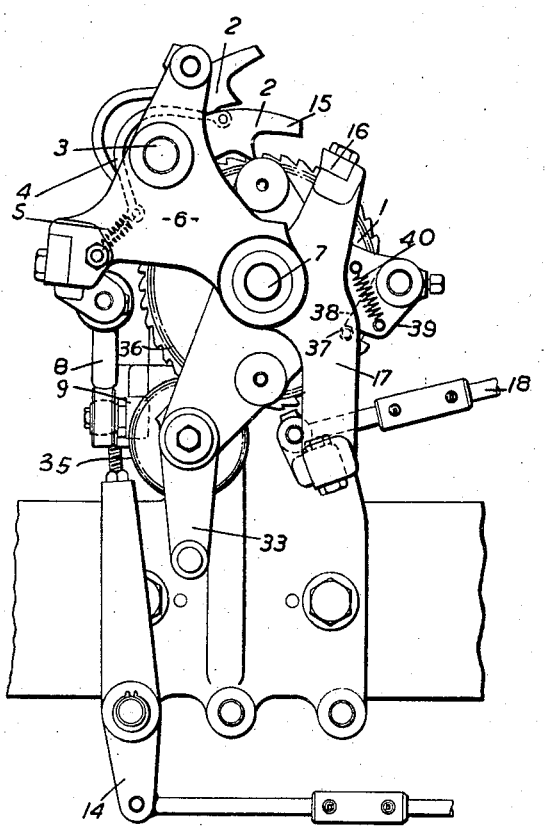
Figure 1 is a front end view of a multi-pawl-and-ratchet-wheel pattern drum device according to the invention.

The main component of this drum mechanism, see Figures 1 and 2, is a drum 1 having its circumferential surface formed with a plurality of annular rows of ratchet teeth, the rows being disposed side by side along the length of the drum. At one circumferential location in the drum the adjacent teeth of all the rows of teeth are in alignment in a direction parallel to the drum axis and from this location, round the drum, the arrangement of the teeth varies from one row to the next by being composed of different sequences of shallow teeth and deep teeth; for example one row of teeth may be composed of an alternating sequence of two shallow teeth and one deep tooth, and so on. For engaging with the teeth of the drum there is a plurality of pawls 2 mounted on a common pivot 3 and being individually and manually displaceable from an operative location in engagement with the teeth of the appropriate row, to an inoperative location clear of the teeth. Conveniently, curved links 4 and springs 5 are provided for locating the pawls in whichever position they are moved to by hand. The pawls 2 are adapted to be continuously racked conveniently through the medium of brackets 6 carrying the pivot 3, these brackets 6 being mounted on a pivot 7 carried by a suitable fixed support. The brackets 6 are operated through the medium of suitable connections, indicated generally at 8, to a truck lever 9 having a truck 10 spring biassed by a spring 11 on to a cam 12 on the main cam shaft 13 of the machine (see particularly Figure 2). If desired the racking may be prevented for a special occasion, such for example as for a striping draw-back course, by means such as an arm and link or rod indicated generally at 14.

Figure 9:
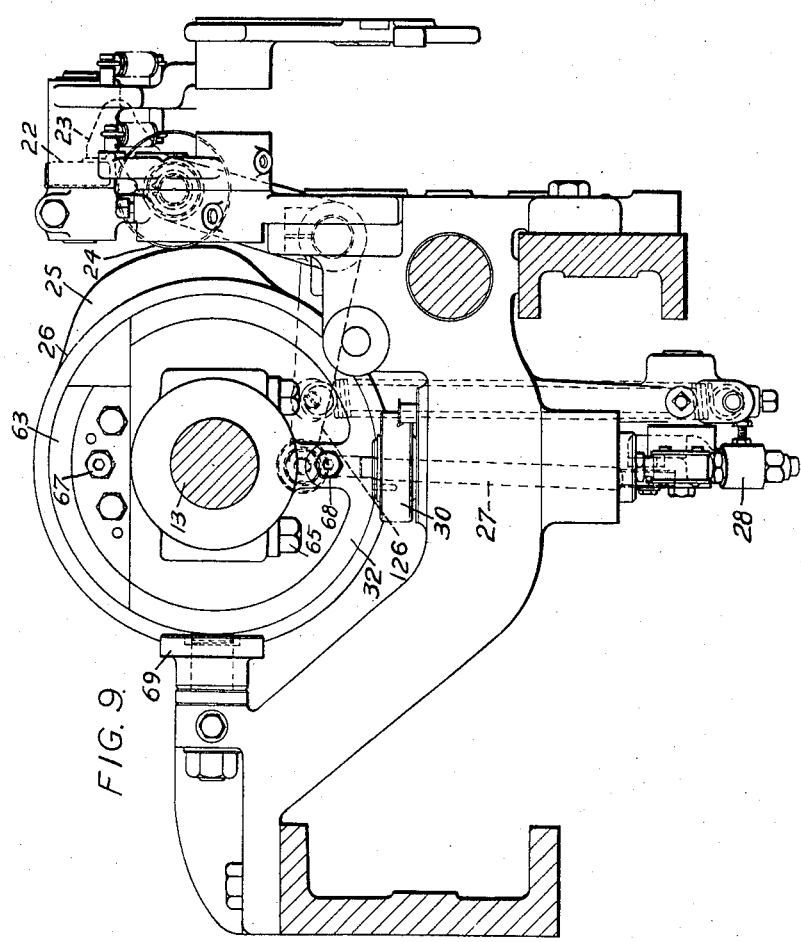
Figure 9 is an end or cross sectional view of the cam shaft shogging mechanism.

Each pawl 2 has an operative end 15 for engaging or missing a bar 16 that is carried by a structure 17; the latter is pivoted on the pivot 7 and is connected by a rod 18 to machine speed control and cam shaft shogging means. This is diagrammatically illustrated in Figure 10 which shows the pivoted structure 17 connected by the link 18 to a pivoted arm 19, this arm 19 being connected by a rod and other mechanism indicated generally at 20, to a member 21 which is suitably connected to speed control mechanism in the machine such as to the rod 31 in Figure 2 of said British Patent No. 399,358, it being understood that operation of the arm 19 by the pivoted structure 17 from the drum 1 reciprocates the rod 31 which accordingly operates the brush adjusting gear wheel 12 as described in said British Patent No. 399,758 or the equivalent wheel 11 of U.S. Patent No. 2,333,063 as and for the purpose described therein of changing the speed during those courses in which fashioning or other transfer operations are effected, it being also understood that the motor, of said patents, under control of the wheel 11 or 12 has a suitable drive transmitting connection with the main cam shaft 13 in a manner which is so well known as not to require further description or illustration herein. The pivoted arm 19 is connected to a detent 22 which is operable to control shogging of the cam shaft 13 conveniently through the medium of conventional cam shaft shogging means substantially as and for the purpose described in said U.S. Patent Nos. 658,826 and 703,055; briefly, referring now to Figures 8 and 9, the detent 22 is normally in an operative position engaging behind a truck arm 23 to hold its truck 24 from riding down a high part 25 of the cam 26 on the main cam shaft 13 (these parts 13, 22, 23, 24 and 26 are old and can be identified by corresponding parts X, $O_8$, $O_7$, $O_4$ and $O_5$ respectively in said U.S. Patent No. 658,826). When however the detent 22 is displaced from behind the truck arm 23 by movement of said bar 16 (Figure 10), rod 18 and pivot arm 19 (and, through the medium of a connecting spring 125), the truck 24 (Figure 9) is allowed to ride down the high part 25 of the cam 26. The truck arm 23 is thus rocked so that a tail part 126 thereof lowers a rod 27 to the lower end of which there is connected a tappet lever 28 for displacing a pair of plunger trucks 29, 30 (which are equivalent to the truck $O_3$ of said U.S. Patent No. 658,826) alternatively into and out of operative position for engagement with a pair of shogging cams 31, 32 (these cams 31, 32 are old and can be identified by the cams O, $O_1$ respectively of said U.S. Patent No. 658,826) respectively. Thus when the detent 22 is tripped the appropriate shogging cam 31 or 32 rides against the appropriate plunger trucks 29, 30 thereby to cause the necessary shogging of the cam shaft 13 on which the shogging cams 31, 32 are fixed. This shogging of the cam shaft, as outlined in said U.S. Patent Nos. 658,826 and 703,055 either brings a plain cam ($G_4$) on the cam shaft into operative position on a truck by movement of which normal knitting takes place or brings the fashioning cam ($G_2$ or $G_3$) as designated in the patent on the cam shaft into operative position on the same truck by movement of which fashioning takes place. The cam shaft 13 is automatically shogged back when the cam 26 has completed a revolution so that the high part 25 re-engages the truck 24 and reverses the plunger trucks 29 and 30, detent 22 then returning to the operative position holding the truck 24 from again returning.

Slowing down of the speed of the machine and shogging of the cam shaft in the aforesaid manner is automatically effected at regular intervals dependent on which of the pawls 2 is located in the operative position. More specifically for each period that a selected pawl is in engagement with the shallow teeth the head 15 will not engage with the bar 16 so as not to effect the speed control and shogging, but each time the selected pawl drops into a deep tooth said head 15 will in fact engage the bar 16 and thereby displace it and operate the speed control and shogging as described through the medium of said mechanism including the rod 18. With regard to the effect of this on the frequency of fashioning it should be explained that the pawls 2 are racked once for each knitted course and consequently the racking of the drum 1, when the shallow teeth are operative, represents the production of the equivalent number of plain i.e. non-fashioning courses in the machine, whilst racking of the drum when a deep tooth is operative represents a fashioning course being produced. Thus pawls and rows of teeth represent fashioning at different course intervals and when it has been decided what frequency of fashioning is required it is only necessary to move the appropriate pawl into operative engagement with its row of teeth.

If desired one or more of the rows or teeth may be adapted for the fashioning to be curved by having their shallow teeth progressively increasing in number in each group thereof from the starting position e.g. first two then three and so on say up to nine, or varying in any other desired sequence. Therefore either a regular or varying sequence may be carried out as and when desired and a change may be readily made from one to the other; for example if using a progressively increasing sequence say up to seven, then this sequence may be stopped by idling the appropriate pawl and then another sequence, say a regular sequence of seven, may be started by movement of the appropriate pawl for this sequence into operation.

One advantage of the arrangement as so far described is that the drum may be of any suitable length such that any convient number of different fashion frequencies may be provided for by having the appropriate number of rows of teeth and pawls; another advantage is that each fashion selection is separate and distinct from the others thereby requiring one operation of the pawls without additional operations as heretofore. A further advantage is that the operation of selecting the speed control and the shogging mechanism by the common rod 18 and associated parts is effected in the same course during which shogging and fashioning takes place.

The alignment of the teeth of the various rows of teeth at said one circumferential location constitutes a zeroing position for the drum, and the teeth at said location are all deep teeth; consequently immediately after any one selection, and providing the drum is in zero position, the operative head 15 of the selected pawl immediately engages the bar 16 to cause the speed change and shogging of the cam shaft. The drum may be zeroed at any desired time, even while the machine is running, provided that all the pawls are in their inoperatiive positions and for this purpose it is adapted to be rotated by hand conveniently through the medium of a handle 33 (Figures 1 and 2) which when pushed in to engage a spring releasable clutch 34 is connected to gears 35, 36 having suitable driving connection with the drum 1. There may be stop means for determining when the drum has in fact been rotated to the zero position, such stop means conveniently comprising a peg 37 on the drum adapted to engage the hose 38 of a pivoted latch 39 biassed by a spring 40 into operative position.

It will be understood that by the employment of the hand control pattern drum mechanism as above the production of comparatively small quantities of differently shaped articles by the machine may be readily carried out; furthermore the mechanism may be rendered ineffective at any time merely by having all the pawls in the inoperative position.

As previously intimated it is sometimes desired to produce a considerable number of articles of the same shape and in this event it may be required to have automatic pattern control means.

Figure 4:
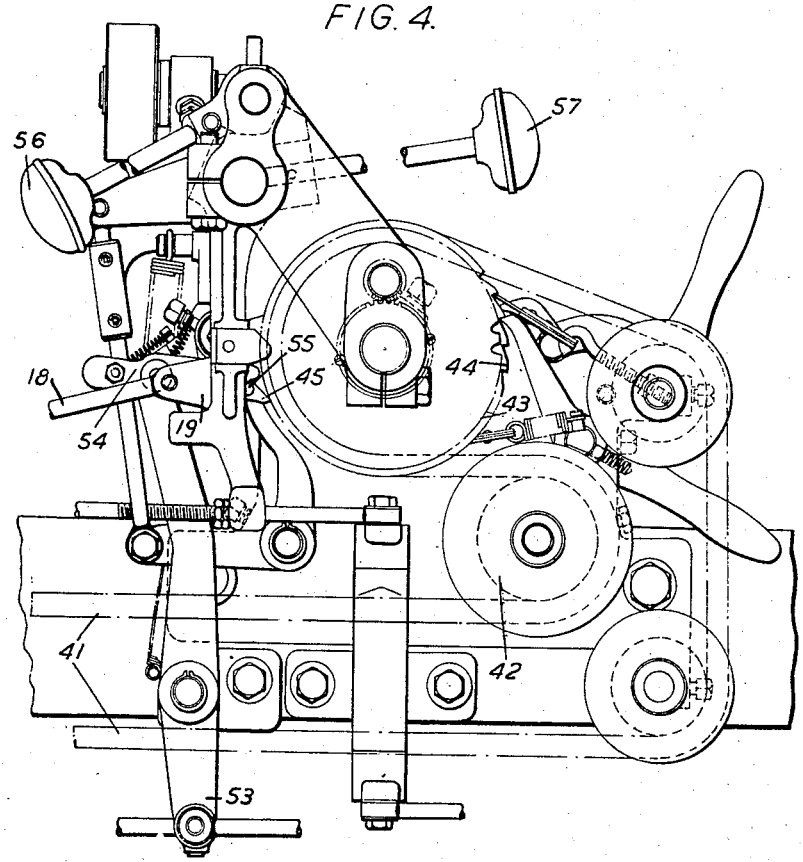
Figure 4 is a front end view of a pattern chain device.
Figure 6:
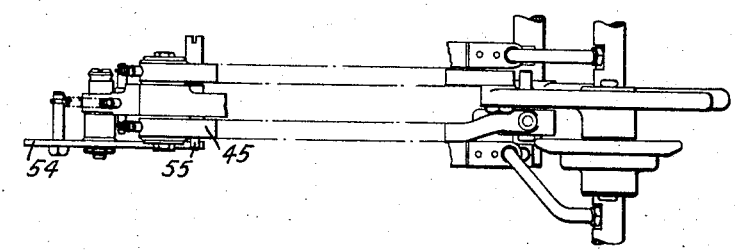
Figure 6 is a plan view of part of Figure 4.

According to the invention such means may consist of known means (see U.S. Patent No. 658,826) comprising a pattern chain 41 (see Figures 4 and 5) (identified by chain P, of U.S. Patent No. 658,826) traversing round sprockets 42, 43 (comparable to sprocket or wheel chain P in the U.S. Patent No. 658,826) and racked round through the medium of a ratchet wheel 44, clawker 45, and truck lever 46 (corresponding to elements $P_4$, $P_3$ and $P_2$ respectively in U.S. Patent No. 658,826) having a truck 47 biassed by a spring 48 on to a cam 49 on the main cam shaft 13. The chain 41 is conveniently of the type having several longitudinally disposed and transversely spaced lines or series of pattern bits (comparable to elements $P_5$, $P_6$, $P_7$ respectively in U.S. Patent No. 658,826) adapted for engaging pivoted arms one of which (comparable to element $P_8$ in U.S. Patent No. 658,826) is constituted by the aforesaid pivoted arm 19 and others of which are indicated at 50, 51 and 52. Conveniently the arm 50 is connected to suitable mechanism for saving links in the chain in known manner, lever 19 is for the speed change and shogging of the cam shaft in the manner previously referred to, the arm 51 may be for obtaining slack courses, and the arm 52 may be for effecting slowing or stopping of the machine at desired times.

The clawker 45 is continuously operated from the cam 49, except if stopped at special times, such as for a striping draw-back course, through the medium of arm and rod mechanism indicated generally at 53, which is operative to hold the truck 47 off the cam 49. Furthermore (and assuming that this chain mechanism is in use with the drum mechanism inoperative) the clawker 45 is in continuous engagement with the teeth of the ratchet wheel 44 thereby to rack the chain 41 and cause the pivoted arms 50, 19, 51 and 52 to be operated at appropriate times by the bits on the chain; the mechanism thereby controls the appropriate operations of the machine and particularly pivoted arm 19 controls the frequency of fashioning by the periodic slowing of the machine speed and shogging of the cam shaft at desired course intervals determined by the spacing of the appropriate bits (for the pivoted arm 19) on the chain 41; it will be understood that this control of the frequency of fashioning is entirely automatic.

The drum mechanism and chain mechanism may both be provided in the same machine or only one of them may be provided in the machine as desired. In the event of both of them being provided in the machine the clawker 45 of the chain mechanism is displaceably mounted to be displaced into an inoperative position clear of the ratchet wheel 44 when it is required for the chain mechanism to be inoperative to allow the drum mechanism to control the frequency of fashioning. For holding the clawker 45 in the inoperative position for any desired period there is conveniently provided a hand displaceable catch 54 adapted to have releasable engagement with a peg 55 on the clawker 45 when the latter is inoperative; it will then be understood that when the drum is in use the chain may be idled by taking out the clawker 45, and, when the chain is to be used, the clawker 45 will be in and the drum will be idled by having all the pawls 2 inoperative.

Associated with the chain mechanism there may be hand operated means for rendering all of the pivoted arms 50, 19, 51 and 52 inoperative (when the machine is not running) say for positioning of the chain; for example said arms may be idled through the medium of a knob handle 56. There may be a further knob handle 57 connected only to the pivoted arm 51 whereby the arm 51 may be operated independently of the chain at any time when the machine is running to cause the production of a slack course at any desired time.

It will be appreciated that the employment of the chain avoids the necessity for hand operations to change the fashioning frequency because the arrangement of the bits on the chain is for this purpose; however, should any further changes be necessary these cannot be carried out without re-arranging the bits on the chain, so that the drum mechanism has the advantage previously intimated over the chain mechanism. Conversely the drum mechanism enables a wide variety of changes to be readily made, but it necessitates a hand operation for change of fashioning frequency so that the chain mechanism has the advantage previously referred to over the drum mechanism.

As previously mentioned the cam shaft shogging mechanism employed with the drum and chain mechanism may be of conventional construction. However if desired this mechanism may be improved in the instance where a spring loaded clutch is employed and when it is desirable for the cam shaft to be shogged in one direction at one location in one revolution of the cams on the cam shaft and to be shogged back again in another position in the revolution of the cams on the cam shaft. This improvement will be described with reference to Figures 8, 9 and 11 to 15. In Figure 11 the spring loaded clutch is indicated at 58, one pair of plain and fashioning cams (which are known cams such as $G_2$, $G_3$, $G_4$ of U.S. Patent No. 658,826) is indicated at 59 with truck lever 60 (comparable to element $G_1$ in U.S. Patent No. 658,-826), and shogging cams are indicated at 61 and 62 for engagement with the aforesaid plunger trucks 29 and 30. The improvements consists in the cams 30 and 31 being initially separate members or blocks (see Figures 9, 12 and 13) adapted for mounting and circumferential adjustment on the main cam shaft 13 (after releasing clamping screws 65, 66, Figures 8, 9, 12 and 15) in different circumferential dispositions with respect to their cam faces 63, 64, say, from the positions shown in Figures 11 and 14 to those shown in Figure 15. This is in contrast to the conventional arrangement wherein the cams 61, 62 (Figure 11) are formed as a unitary member or block. Thus it will be appreciated that one of the shogging cams may be fixed on the shaft in such circumferential disposition as to be suitable for shogging in one direction of the cam shaft at one desired location in a revolution of the cams 59, while the other shogging cam may be disposed in a circumferential disposition on the cam shaft 13 suitable for shogging in the return direction of the cam shaft 13 also at a suitable location in a revolution of the cam 59. The circumferential disposition of the two shogging cams 31, 32, with respect to their cam faces 63, and 64 may be either the same or different as determined by the shapes of the cams 59; particularly said dispositions are appropriately different when the cams 59 require the cam shaft to be shogged in one direction at one location in a revolution of the cams 59 and return shogged at another location in said revolution. In addition to the circumferential adjustment, further adjustment means comprising set screws 67, 68 (Figures 9, 12 and 15) may be provided to move them axially towards or away from each other for the purpose of ensuring that the shogging trucks engage exactly with the commencement of the appropriate accelerating cam faces 63, 64 of the shogging cams 31, 32 to effect the smoothest possible shogging movement of the cam shaft. Fig. 14 shows cams 63 and 64 circumferentially in line, while Fig. 15 shows cam 64 advanced.

A further improvement which may be incorporated in the shogging mechanism is the provision of fixed trucks 69 and 70 (Figures 9, 12, 14 and 15) conveniently at a rearward location in the machine and spaced at such a distance apart on each side of the shogging cams 31, 32 as to positively limit the extent of shogging of the cam shaft 13 in each of its shogging directions, thereby preventing any over-shogging motion.

We claim:

1. In a straight bar knitting machine the combination of a pattern device constructed and arranged for a wide range of pattern selections to be made manually e.g. for fashioning of differently shaped articles, a second pattern device constructed and arranged for predetermined pattern selections to be made automatically e.g. for fashioning identically shaped articles, and control means for rendering each pattern device operative and inoperative independently of the other.

2. The combination as claimed in claim 1, in a machine equipped with machine speed control, a cam shaft, cams thereon and followers, and shogging means for changing the relation between the cams and followers, including mechanism common to both of said pattern devices for operation of said speed control and shogging means, and the control means being adapted to render each of the pattern devices operative and inoperative on said common mechanism independently of the other.

3. The combination as claimed in claim 2 including a spring loaded clutch for disengaging the drive whilst shogging takes place, and said shogging mechanism includes a pair of shogging cams capable of location with their corresponding cam faces in different relative positions.

4. Mechanism as claimed in claim 3 having adjustment means for relative circumferential adjustment of the shogging cams.

5. Mechanism as claimed in claim 3 having adjustment means for relative axial adjustment of the cams.

6. Mechanism as claimed in claim 1, in a machine equipped with machine speed control, a cam shaft, cams thereon and followers, and shogging means for changing the relation between the cams and followers, including mechanism common to both of said patterns devices for operation of said speed control and shogging means, the control means being adapted to render each of the pattern devices operative and inoperative on said common mechanism independently of the other, and constructed and arranged such that the speed control operation through the medium of said common mechanism is effected in the same fashioning course of knitting in which the shogging is effected.

7. Mechanism as claimed in claim 1 wherein one pattern device is adapted for manual selective control to obtain a plurality of alternative pattern selections as and when required by having a plurality of selection elements arranged for manual displacement into and out of operative engagement with pattern means, and the second pattern device is adapted for operation to automatically obtain a pattern selection arrangement of predetermined character by having a predetermined set of pattern elements on a pattern element carrier.

8. For a straight bar knitting machine, a cam shaft, cams thereon and followers, a pattern device adapted for selective manual control to obtain a plurality of alternative pattern selections and suitable for operation in correspondingly selective manner to operate machine speed control and shogging means for changing the relation between the cams and followers for fashioning at different course intervals according to the different selections, and having mannually operable means for ensuring when desired that said means is operated by initial operation of the device, thereby to immediately commence the full fashioning course sequence.

9. A mechanism as claimed in claim 8 having the manually operable means consisting of means for zeroing the pattern device at required times.

10. A mechanism as claimed in claim 8 constructed and arranged such that there is only one selection element for each selection.

11. A mechanism as claimed in claim 8 constructed and arranged such as to provide a plurality of alternative regular spaced course frequencies of fashioning.

12. A mechanism as claimed in claim 8 constructed and arranged to provide a plurality of alternative regular spaced course frequencies of fashioning for generally inclined fashioning lines, and at least one other frequency such for example as to produce curved fashioning lines.

13. In a straight bar knitting machine, the combination of a cam shaft, cams thereon including shogging cams, and cam followers, a manually selective pawl and ratchet pattern drum, a pattern chain device, common mechanism for transmitting motion from these two devices to operate a machine speed control and shogging mechanism for changing the relation between the cams and followers, manually operable means for rendering either of the devices operative whilst the other is inoperative on said common mechanism, means for adjustment of the shogging cams relatively to each other, and means for preventing over-shogging of the cams in either shogging direction.

(References on following page)

References Cited in the file of this patent

UNITED STATES PATENTS

| | | |
|---|---|---|
| 1,873,481 | Richter et al. | Aug. 23, 1932 |
| 1,982,991 | Howie et al. | Dec. 4, 1934 |
| 2,214,936 | Pingel | Sept. 17, 1940 |
| 2,333,063 | Wilders et al. | Oct. 26, 1943 |
| 2,516,514 | Haehnel | July 25, 1950 |

FOREIGN PATENTS

| | | |
|---|---|---|
| 381,224 | Great Britain | Oct. 3, 1932 |
| 488,436 | Great Britain | July 7, 1938 |